C. A. PFANSTIEHL.
HYDROGEN PURIFYING, CLEANING, AND CIRCULATING SYSTEM.
APPLICATION FILED APR. 26, 1915.
1,286,088.
Patented Nov. 26, 1918.
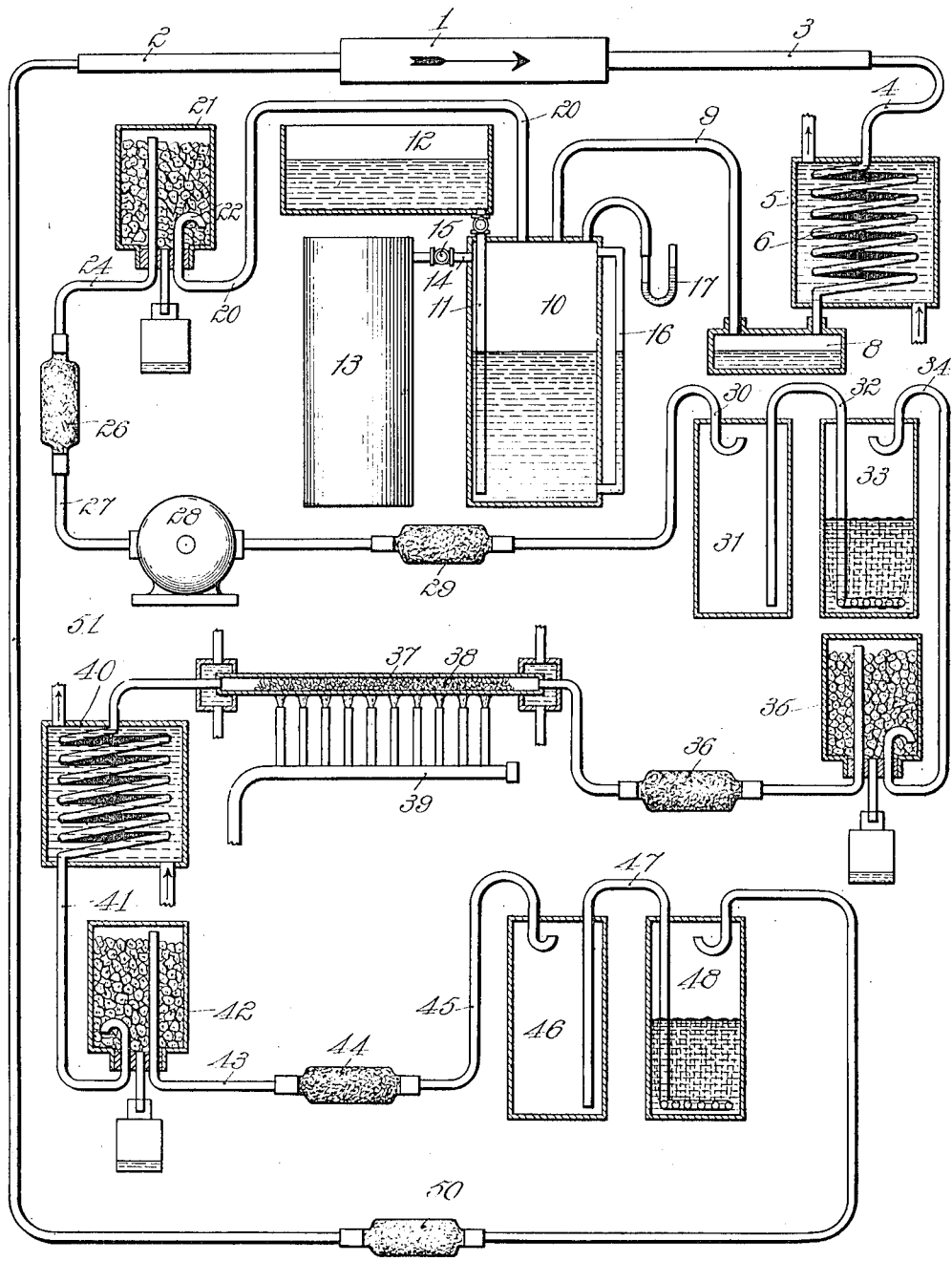
Witnesses:
Robert F. Bracke
Albin C. Ahlberg.
Inventor
Carl A. Pfanstiehl
By Williams & Bradbury
Attorneys

UNITED STATES PATENT OFFICE.

CARL A. PFANSTIEHL, OF WAUKEGAN, ILLINOIS, ASSIGNOR TO PFANSTIEHL COMPANY, INC., OF NORTH CHICAGO, ILLINOIS, A CORPORATION OF NEW YORK.

HYDROGEN PURIFYING, CLEANING, AND CIRCULATING SYSTEM.

1,286,088.     Specification of Letters Patent.     Patented Nov. 26, 1918.

Application filed April 26, 1915. Serial No. 24,039.

*To all whom it may concern:*

Be it known that I, CARL A. PFANSTIEHL, a citizen of the United States, residing at Waukegan, in the county of Lake and State of Illinois, have invented a certain new and useful Improvement in Hydrogen Purifying, Cleaning, and Circulating Systems, of which the following is a full, clear, concise, and exact description, reference being had to the accompanying drawings, forming a part of this specification.

My invention relates to a hydrogen cleaning and circulating system for use in the reduction of tungsten trioxid $WO_3$ to metallic tungsten.

Metallic tungsten has now become an extremely important article of commerce. The grade and fineness of the metallic tungsten powder depend in the first instance upon the grade and fineness of the tungsten trioxid which is reduced to produce the metal. They also depend upon the proper treatment of the tungsten trioxid during the reducing process. It has been found that coarse and more or less crystalline tungsten is produced from the finest obtainable tungsten trioxid if the hydrogen which is passed over the trioxid in the reducing furnace is fed to it too slowly or if the temperature of the tungsten trioxid is increased too rapidly in the presence of hydrogen. In order that the best results may be obtained fresh, dry, and pure hydrogen gas must be brought into contact with the tungsten trioxid in large quantities and at a considerable velocity so that the water vapor which is produced by the union of the hydrogen and the oxygen will be mechanically carried away and thus prevented from collecting in any appreciable quantities in the presence of the trioxid. The presence of a very slight amount of moisture interferes with the reduction of the trioxid in the form of individual grains similar to the individual grains of the trioxid itself and causes these grains to unite into a coarse crystalline formation.

By a simple chemical calculation it may be shown that approximately twenty-six grams of hydrogen gas are required to actually combine with the oxygen contained in one kilogram of tungsten trioxid. The water produced by the combination of this quantity of hydrogen with the oxygen from a kilogram of tungsten trioxid will have a weight of substantially two hundred and thirty-three grams and a volume of substantially two hundred and thirty-three cubic centimeters. In order to carry off this quantity of water in the form of vapor and to maintain the percentage of water vapor in the hydrogen which is brought into contact with the tungsten trioxid low enough that the trioxid will not be crystallized in its reduction many times the volume of hydrogen which actually combines with the oxygen must be passed through the reducing furnace during the reduction process. It is the object of my invention to provide means for collecting the hydrogen in which is suspended water vapor and to so purify and dry it that it may be again passed over the tungsten trioxid in the form of pure, dry, and clean hydrogen. In carrying out my invention I utilize a number of pieces of associated apparatus including condensers, a supply and pressure regulator, a circulation pump, and a plurality of driers and cleansers each of which will be more particularly described in the following specification.

My invention is illustrated in the accompanying drawing which shows the schematic circuit arrangement of the various pieces of apparatus which are also illustrated by schematic drawings in which no attempt has been made to illustrate the relative size of the various pieces of apparatus.

In operating the system here illustrated, the hydrogen, purified by the specific means hereinafter described, enters the reducing furnace 1 at the left end of the entrance tube 2. This furnace is preferably electrically heated and may be of the type illustrated in my application, Serial No. 21,559, filed April 15, 1915, or any other suitable type in which a substantially long and narrow reduction tube is provided whereby the hydrogen may be caused to pass into and out of contact with the heated tungsten trioxid with a considerable velocity. When the hot hydrogen passes out of the exit tube 3 of the reducing furnace it contains a small amount per volume of water vapor. This wet and hot gas is then conducted by means of a tube 4 into the tube of the condenser 5, which comprises a coil of pure tin pipe which is immersed in running water. This coil is arranged so as to have no pockets or traps and the water condensed therein thereafter drips out into the Wolff's bottle 8 which may be emptied as often as is necessary. From the Wolff's bottle 8, the hydrogen gas, from which most of the moisture has been removed, passes through the tube 9 into the pressure regulating and supply reservoir 10. This reservoir is partly filled with water and is connected by means of a tube 11 with an open water supply reservoir 12.

A main hydrogen supply tank 13 is connected with the upper portion of the reservoir 10, thus providing means for supplying the circulating system with new hydrogen to take the place of that which unites with the oxygen of the tungsten trioxid. The tank 10 is provided with a sight gage 16 and with a U tube 17 containing mercury or other fluid, the two gages serving to indicate the amount and pressure of the hydrogen in the upper part of the reservoir 10. The pipe 20 leads from the upper part of the reservoir 10 into an inverted bottle 21 containing calcium chlorid, the entrance tube being turned down within the bottle at 22 to prevent moisture from draining into the tube 20. The gas which leaves the tank 20, and from which the greater portion of the water vapor has been removed by means of the condenser 5, is more thoroughly dried by its passage through the calcium chlorid, a well known property of which is that of the absorption of moisture. The tube 24 carries the dry hydrogen out of the bottle 21, this tube extending to near the top of the bottle and above the calcium chlorid so as to avoid the dust from the calcium chlorid to as great an extent as possible. However, some slight quantity of dust will pass into the tube 24, this being removed by passing the gas through a vessel 26 which is filled with cotton. The tube 27 leading from the cotton filter connects with a rotary pump 28 of the May-Nelson, or Crowell type, which serves to circulate the hydrogen, thence through a second cotton filter 29 which collects any oil which may pass out of the pump 28, and to the top of the trap chamber 31 by way of the tube 30, from near the bottom of which trap chamber 31 the tube 32 leads to the bottom of the tank 33, the latter end being formed into a spiral provided with a large number of small perforations through which the gas passes in small streams into a solution of potassium permanganate made alkaline with sodium hydroxid with which the tank 33 is substantially half filled. The purpose of this solution is to remove any traces of oil from the hydrogen which may pass the filter 29. The object of the trap tank 31 is to prevent the solution contained in tank 30 from being drawn back into the filter 29 and pump 28 when the apparatus is shut down and the gas in the furnace cools and, therefore, contracts. Under these conditions some of the solution may be drawn over from the tank 33 into the trap tank 31, but upon restarting the apparatus in operation the solution will be driven back into the tank 33, as illustrated. Extending from the top of the tank 33 is a tube 34 leading into a second calcium chlorid drying bottle 35 arranged similarly to the bottle 21, the purpose of this being to collect any moisture which the gas may absorb from the solution in the tank 33. From this calcium chlorid bottle 35 the gas is carried through a cotton filter 36, the function of which is the same as the filter 26, and then into the entrance of the pipe 37 which is filled with copper filings, or thin copper strips 38 which are heated by a plurality of gas burners 39, the function of this apparatus being to remove any traces of free oxygen that may be in the system. The oxygen combines with the hot copper to form copper oxid which is immediately again reduced to metallic copper and water vapor by the heated hydrogen. The ends of the tube 37 are preferably water cooled so as not to unduly heat the lead in and out piping. The hot gases from the deoxidizing tube 37 are carried through the tube of the cooler 40, which is similar in construction to the condenser 5, but which need not be provided with a Wolff's bottle since the amount of condensation is insufficient to necessitate this additional apparatus.

The tube 41 leading from the cooler 40 is connected with a calcium chlorid drying bottle 42, similar in construction and function to the bottles 21 and 35. From the bottle 42 the tube 43, which contains a cotton filter 44 similar in function to the filters 26 and 36, leads to the top of a trap tank 46 which is similar in function to the trap tank 31. Leading from near the bottom of this tank is a tube 47 which is provided at its other end with a spiral located near the bottom of the tank 48, which is substantially half filled with concentrated sulfuric acid, the purpose of which is to remove the last traces of moisture from the gas as it percolates in fine streams from holes in the spiraled end of the tube 47. The gas is now thoroughly purified and dried, but is, nevertheless, passed through an additional cotton filter 50 to insure against any splashings of sulfuric acid or other unexpected impurities being carried into the reducing furnace with which the pipe 51, extending from the filter 50, connects.

By the use of the system herein described, a constant flow of pure hydrogen may be passed through the reducing furnace 1, the only loss being that which combines with the oxygen of the tungsten trioxid. It has been found that this arrangement not only greatly decreases the expense of reducing the tungsten trioxid, but also produces a finer and more valuable form of metal powder than has been produced by prior commercial processes.

Although it is possible to omit certain of the pieces of apparatus in the herein described system of purifying hdrogen the omission will be at the expense of materials contained in other pieces of apparatus, or else the result will be less satisfactory than that obtained by my arrangement. Of course if the hydrogen gas is not so thoroughly dried before reaching the concentrated sulfuric acid it will be dried therein, but the acid will have to be replenished more often since it will become diluted by reason of the absorption of moisture from the gas. Furthermore, the arrangement of the apparatus may be altered without seriously affecting its operation or result, that is, different pieces of apparatus may be located at different points in the series. Each piece of apparatus, however, I believe performs its function the best when located with respect to each other piece of apparatus as herein shown and described, though, as above pointed out, I do not wish to be unduly limited to this specific arrangement.

What I claim as new and wish to secure by Letters Patent of the United States is:

In a hydrogen drying, cleaning, and circulating system, means delivering impure moist hydrogen containing a trace of free oxygen to one part of the system, a supply reservoir, means for maintaining the pressure therein substantially constant for different quantities of gas therein, a circulating pump, a heated de-oxidizing chamber containing a material with which the free oxygen readily unites, and piping serially connecting said supply reservoir, de-oxidizing chamber and circulating pump in series.

In witness whereof, I hereunto subscribe my name this 21 day of April, A. D. 1915.

CARL A. PFANSTIEHL.

Witnesses:
S. LEPKE,
J. W. SNOXE.